(12) United States Patent
Wehrli

(10) Patent No.: US 6,821,066 B2
(45) Date of Patent: Nov. 23, 2004

(54) PRECAST CONCRETE PANEL COMBINATION TRAILER AND STORAGE RACK ASSEMBLY

(75) Inventor: Richard F. Wehrli, Naperville, IL (US)

(73) Assignee: 21st Century Structures, LLC, Naperville, IL (US)

( * ) Notice: Subject to any disclaimer, the term of this patent is extended or adjusted under 35 U.S.C. 154(b) by 0 days.

(21) Appl. No.: 10/420,164

(22) Filed: Apr. 22, 2003

(65) Prior Publication Data

US 2004/0213643 A1 Oct. 28, 2004

(51) Int. Cl.$^7$ .................................................. B60P 3/40
(52) U.S. Cl. ...................................... 410/32; 414/458
(58) Field of Search ............................ 410/31, 32, 34, 410/35, 45, 68; 414/458, 459, 495; 254/45; 280/402; 296/181, 182

(56) References Cited

U.S. PATENT DOCUMENTS

| | | | | |
|---|---|---|---|---|
| 1,926,551 A | * | 9/1933 | Miller | 410/32 |
| 2,703,659 A | * | 3/1955 | Hutchins | 414/498 |
| 3,193,301 A | * | 7/1965 | Talbert et al. | 280/43.23 |
| 3,243,193 A | * | 3/1966 | Fulmer et al. | 280/35 |
| 3,253,668 A | * | 5/1966 | Tantlinger | 180/11 |
| 3,645,559 A | * | 2/1972 | Stafford, Jr. | 280/418.1 |
| 3,929,241 A | * | 12/1975 | Putnam | 414/458 |
| 4,087,013 A | * | 5/1978 | Wiley, Jr. | 414/459 |
| 4,405,271 A | * | 9/1983 | Adams | 410/53 |
| 4,666,181 A | | 5/1987 | Wegner | 280/711 |
| 4,753,566 A | | 6/1988 | Wegner | 414/459 |
| 4,863,334 A | * | 9/1989 | Girerd | 414/458 |
| 4,865,510 A | | 9/1989 | Wegner | 414/498 |
| 4,946,182 A | * | 8/1990 | Weber | 280/402 |
| 5,246,241 A | * | 9/1993 | Baver | 280/407.1 |
| 5,417,540 A | * | 5/1995 | Cox | 414/495 |
| 5,527,138 A | * | 6/1996 | Flores et al. | 410/29.1 |
| 6,095,748 A | * | 8/2000 | Zackovich | 414/563 |

OTHER PUBLICATIONS

Nelson Trailers, www.nelsontrailers.com, May 23, 2002.

* cited by examiner

Primary Examiner—D. Glenn Dayoan
Assistant Examiner—Paul Chenevert
(74) Attorney, Agent, or Firm—McAndrews, Held & Malloy, Ltd.

(57) ABSTRACT

A trailer rack assembly stores and transports vertically-oriented panels that are fragile to impacts directed upon their major planar surfaces. The trailer rack assembly includes a bottom frame for supporting the panel in a vertical position, a top frame for containing the panel while being supported on the bottom frame, and a plurality of struts interconnecting the bottom and top frames. The struts are capable of absorbing and distributing lateral forces imposed upon the top frame, the bottom frame and/or the supported panel. One or more attachment projections extend from the rearward portions of the top frame, the bottom frame and/or an interconnecting strut. The attachment projection(s) are attachable to a rear tandem assembly having wheels mounted on one or more axles, the rear tandem assembly, and to a movable front assembly, which supporting the attached trailer rack assembly above the ground surface. Imparting a longitudinal force to one or both of the front and rear assemblies correspondingly urges the trailer rack assembly in the longitudinal direction.

11 Claims, 10 Drawing Sheets

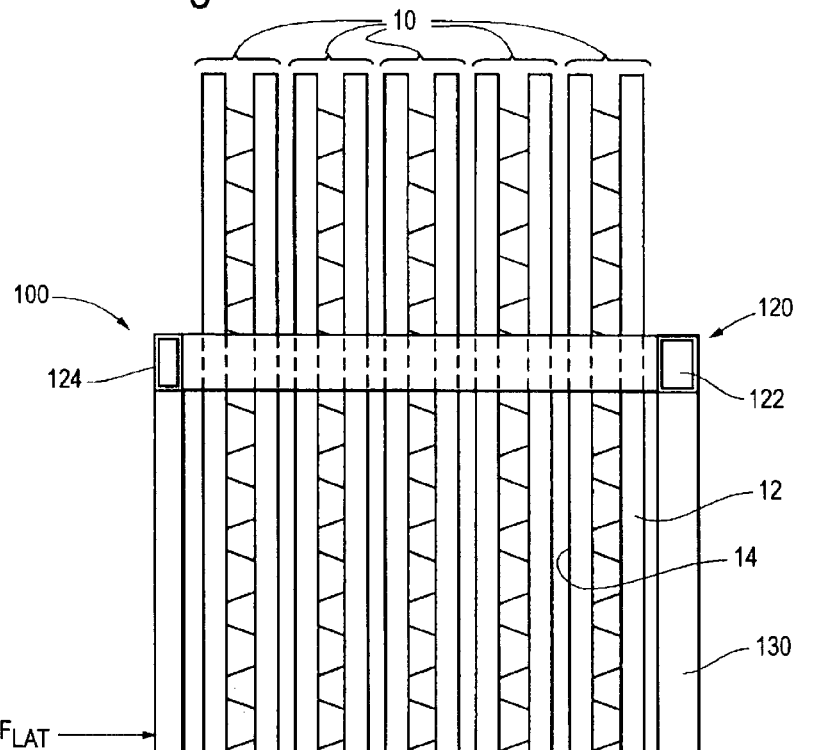
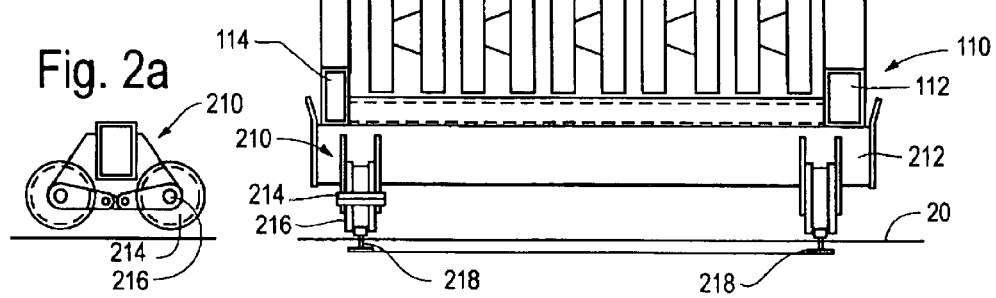
Fig. 2
Fig. 2a

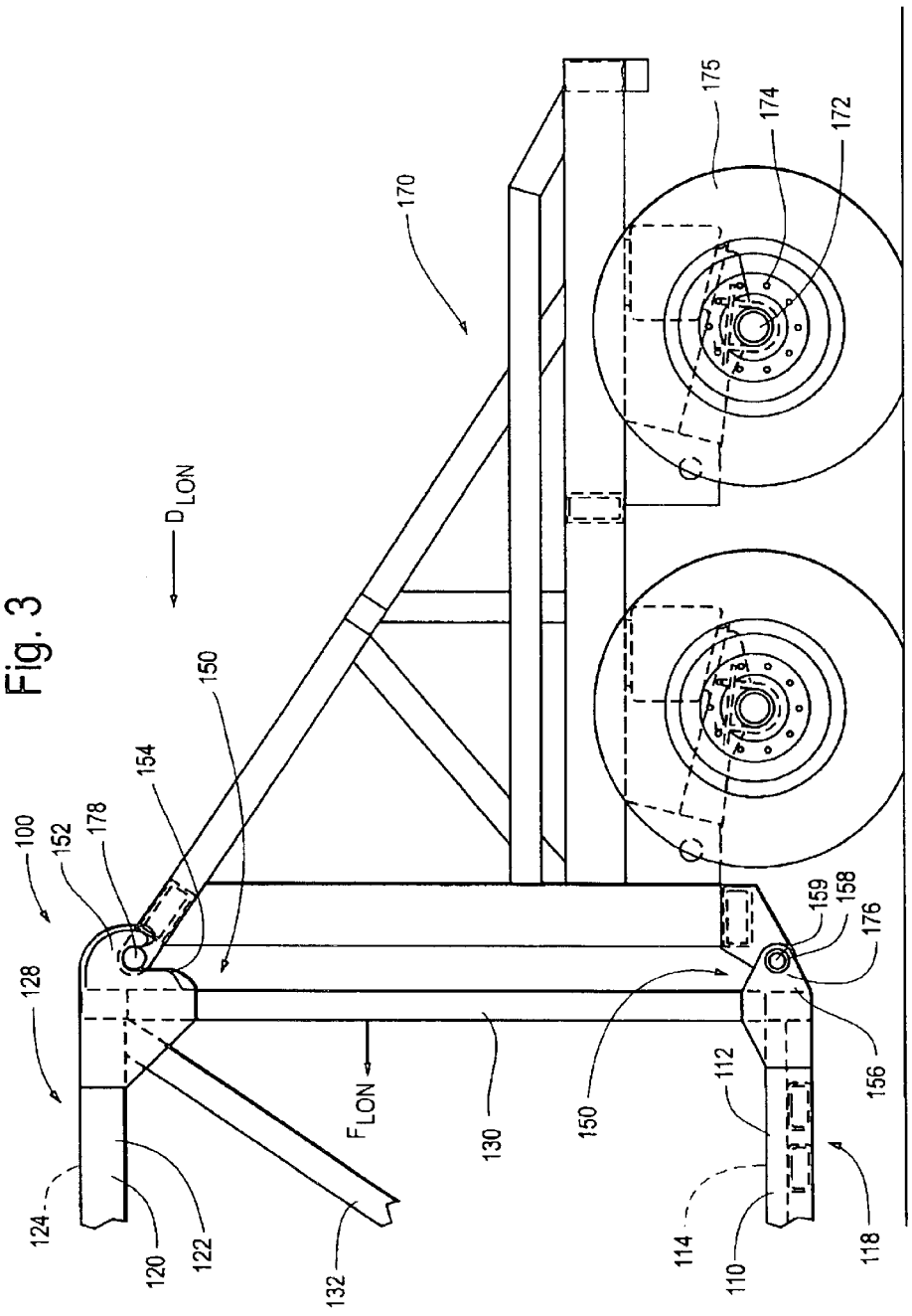

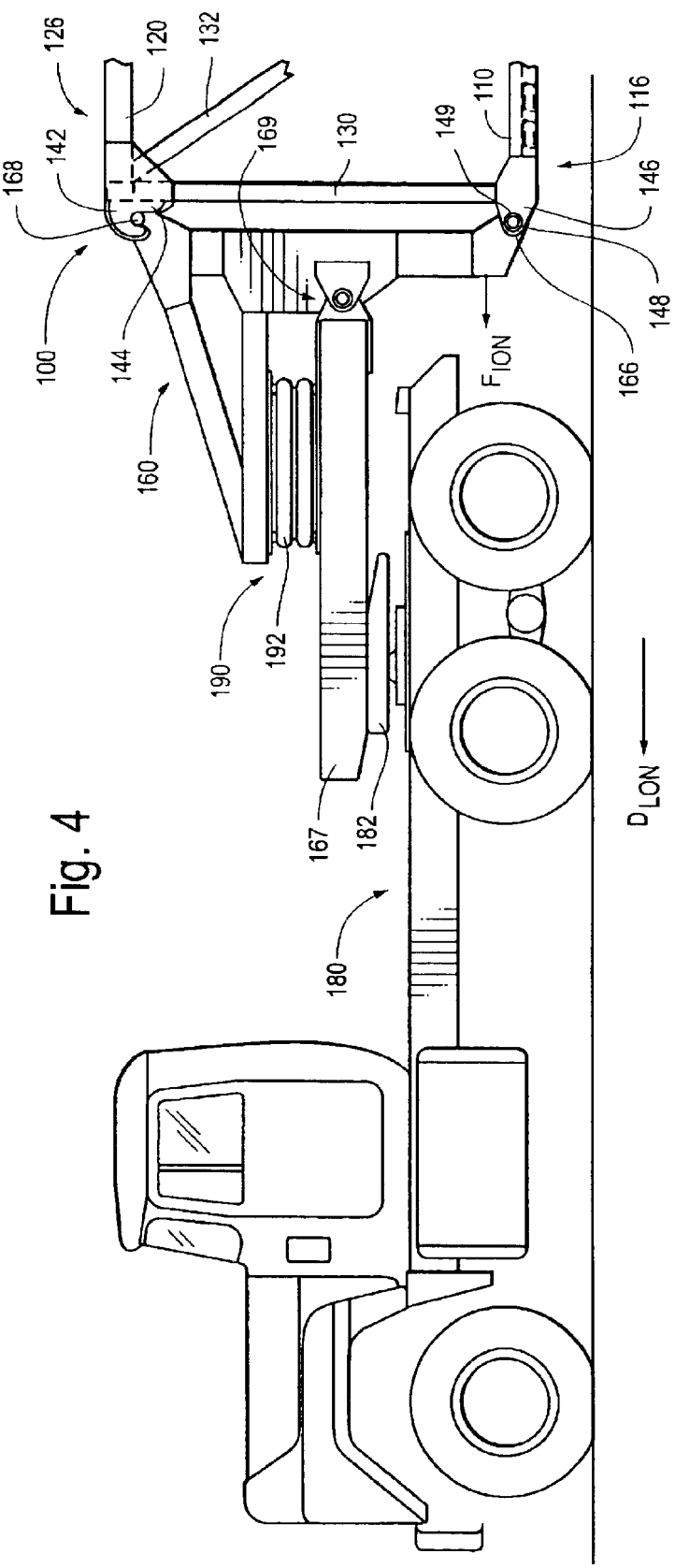

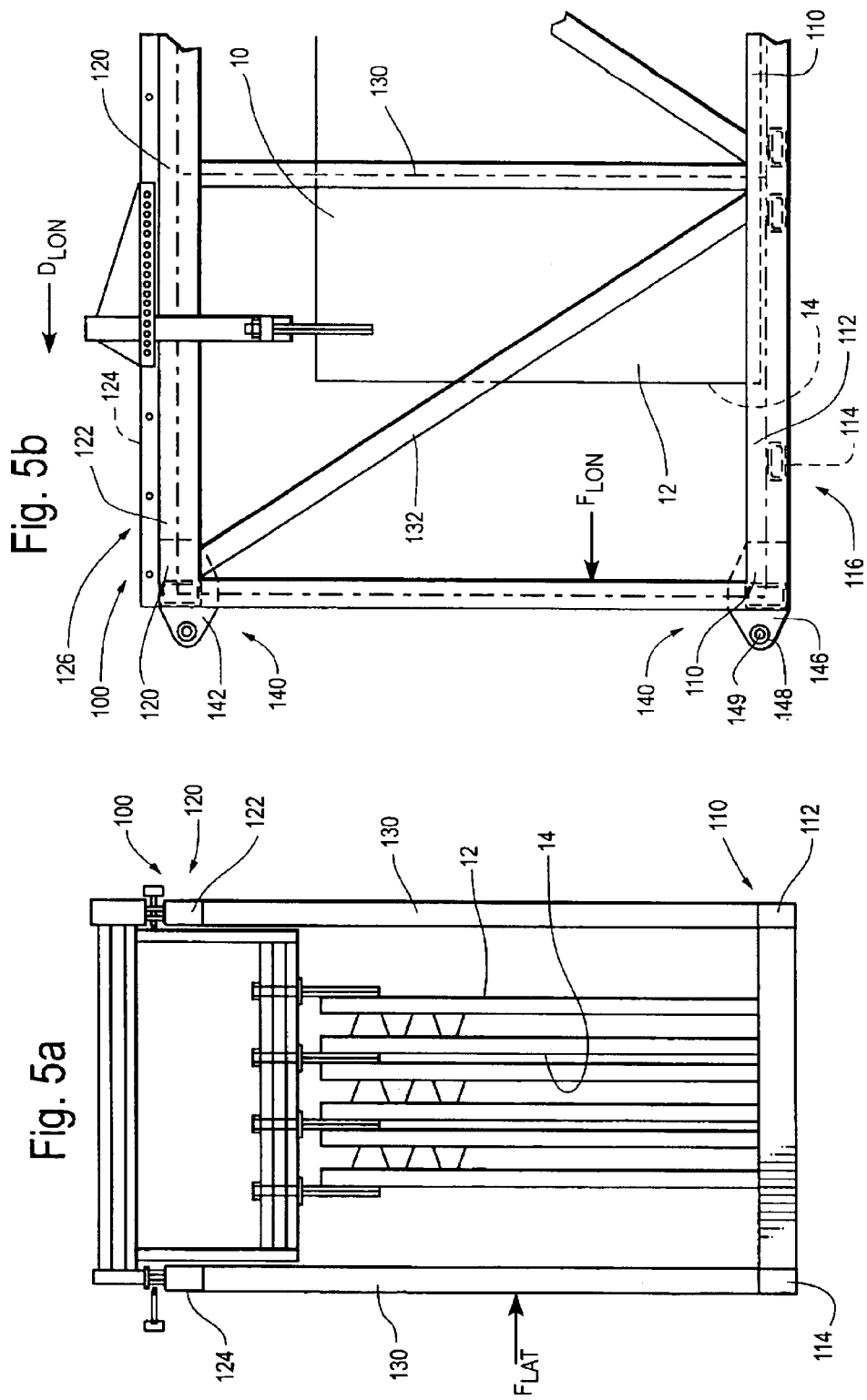

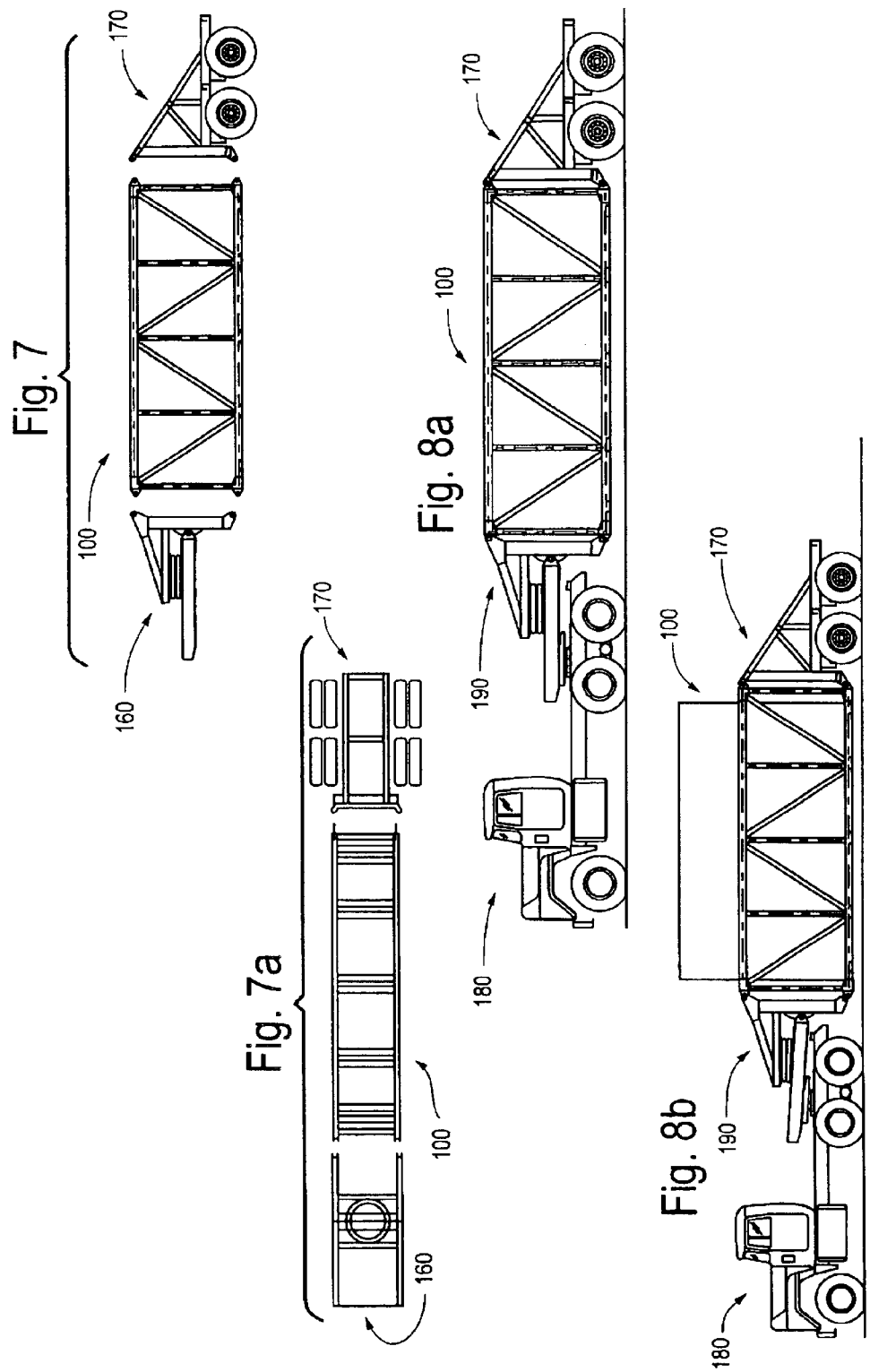

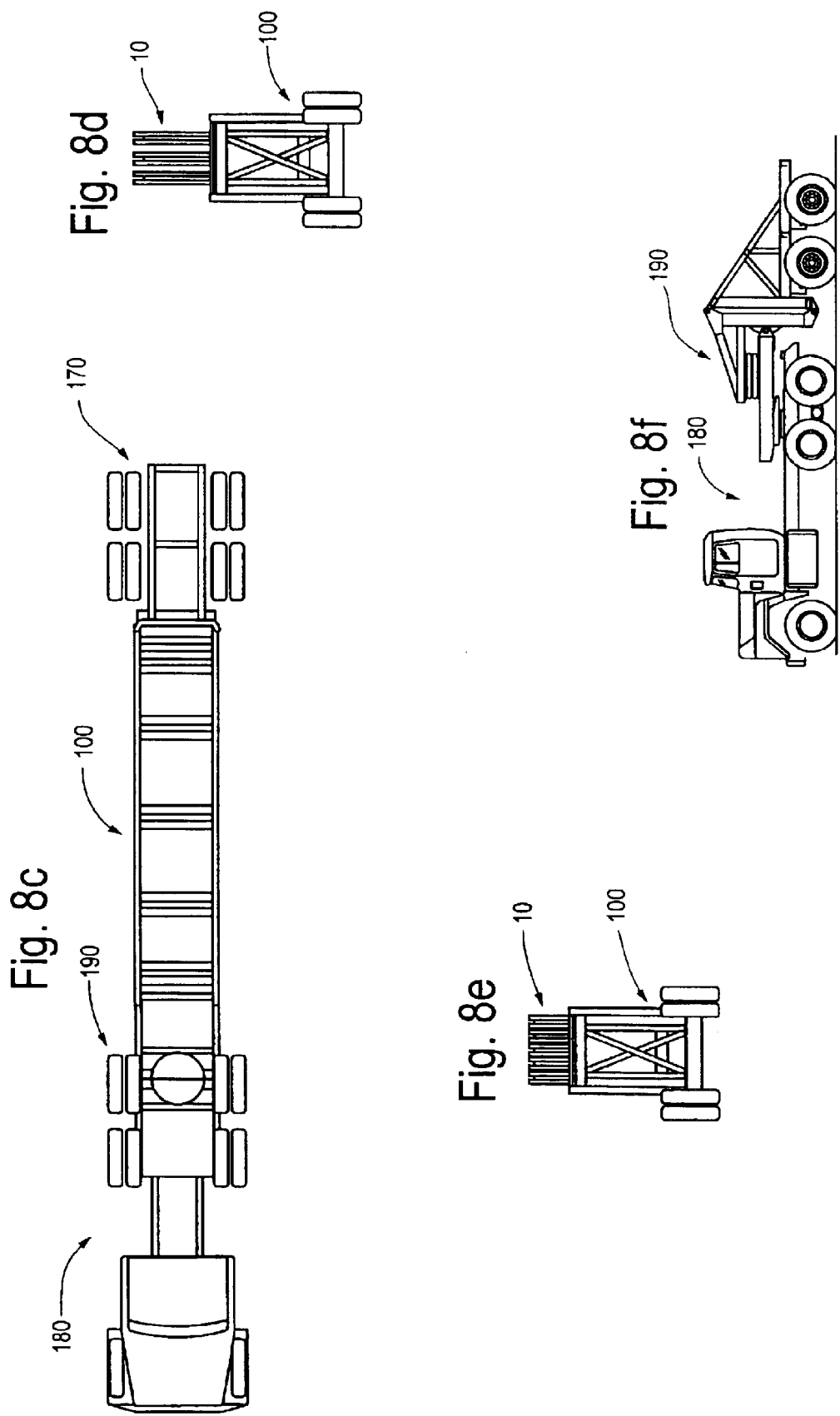

PRECAST CONCRETE PANEL COMBINATION TRAILER AND STORAGE RACK ASSEMBLY

FIELD OF THE INVENTION

The present invention relates to the storage and transporting of vertically-oriented panels. In particular, the present invention provides a combination trailer and storage rack assembly (a "trailer rack assembly"), that is especially well suited for storing and transporting precast concrete panels, such as those employed in the construction of prefabricated buildings.

BACKGROUND OF THE INVENTION

The handling, storing and shipping of large, heavy, vertically-oriented panels, such as concrete wall panels, can be hazardous and expensive due to the numerous times in which a panel must be lifted and moved. Heavy lifting equipment, such as cranes, are normally required to lift and move panels, not only within the in-factory panel manufacturing and storage areas, but also to lift the panels onto trailers for transporting the panels by tractor/trailer to a construction job site where the panels are to be installed.

Reducing the number of times a panel is handled reduces the associated cost, not only in terms of decreasing the number of times that lifting equipment is mobilized to lift a panel, but also because the hazards to the panel (and the handlers) that impacts and stresses from the lifting and moving process can impose on the panel. Reducing the instances in which such impacts and stresses are imposed can reduce damage to the panel and also reduce the exposure of handlers to safety risks associated with damaged panels. In this regard, precast concrete wall panels typically have reinforcing steel bars or rods that extend only in the vertical direction when the panel is oriented vertically, thus preventing the panel from being stored and shipped flat due to the risk of breakage to the panel if impacts and/or stresses are imposed to the unreinforced regions of the panels and/or in a direction that the reinforcing bars cannot readily counteract.

Conventional trailers employed in the transportation of large, heavy, vertically-oriented panels are themselves large, mechanically complicated and expensive. Such conventional trailers are primarily suited to over-the-road transportation of panels, and are generally unsuited to facilitating the in-factory handling and storage of panels. Conventional tractor/trailer assemblies for the transportation of concrete panels are generally designed to transport the panels in a vertically upright position. In addition, panels up to 12 feet tall require transporting, and governmental regulations limit the height to which transported material can extend above the roadway when hauled by a vehicle.

In-factory handling and storage operations are typically performed using equipment and devices that are separate and distinct from those employed in over-the-road transportation. As a result, conventional techniques have disadvantages in terms of excessive time, cost, risk of damage to panels, and, perhaps most importantly, risk of injury to handlers.

The present combination trailer and storage rack assembly overcomes at least some of the foregoing shortcomings associated with conventional techniques for handling, storing and transporting large, heavy, vertically-oriented panels, particularly concrete wall panels. The present trailer rack assembly represents a comprehensive material handling solution that improves in-factory handling, storage and inventory operations, and also improves over-the-road transportation and delivery of large, heavy, vertically-oriented panels to a construction jobsite.

SUMMARY OF THE INVENTION

A combination trailer and storage rack assembly stores and transports at least one vertically-oriented panel. The panel has two oppositely facing outwardly projecting major planar surfaces and exhibits fragility to impacts directed upon at least one of its major planar surfaces. The trailer rack assembly includes:

(a) a bottom frame for supporting the panel in a vertical position, the bottom frame having a pair of longitudinally extending side portions;

(b) a top frame for containing the panel while being supported on the bottom frame, the top frame having a pair of longitudinally extending side portions;

(c) a plurality of struts interconnecting the bottom and top frames, the struts capable of absorbing and distributing lateral forces imposed upon at least one of the top frame, the bottom frame, and the supported panel;

(d) at least one rearwardly disposed attachment projection extending from a rearward portion of at least one of the top frame, the bottom frame and an interconnecting strut, the at least one rearward attachment projection attachable to a rear tandem assembly having at least one transverse axle extending therefrom and a pair of wheels rotatably mounted on the at least one axle, the rear tandem assembly supporting the attached trailer rack assembly above a ground surface;

(e) at least one forwardly disposed attachment projection extending from a forward portion of at least one of the top frame, the bottom frame and an interconnecting strut, the forward attachment projection attachable to a movable front assembly, the forward assembly supporting the attached trailer rack assembly above the ground surface.

In operation, imparting a longitudinal force to at least one of the front and rear assemblies correspondingly urges the trailer rack assembly in the longitudinal direction.

In a preferred trailer rack assembly, at least some of the interconnecting struts are arranged to form a load-distributing truss.

In a preferred trailer rack assembly, at least one rearwardly disposed attachment projection includes a top rearward attachment projection that extends from a rearward portion of the top frame and a bottom rearward attachment projection that extends from a rearward portion of the bottom frame. The top rearward attachment projection is attachable to a top portion of the rear tandem assembly. The bottom rearward attachment projection is attachable to a bottom portion of the rear tandem assembly.

In a preferred trailer rack assembly, the bottom rearward attachment projection has a hole formed therein and the bottom portion of the rear tandem assembly has a hole formed therein. Aligning the holes permits insertion of an attachment pin therethrough, thereby attaching the trailer rack assembly to the bottom portion of the rear tandem assembly.

In a preferred trailer rack assembly, the bottom forward attachment projection has a hole formed therein and the bottom portion of the movable front assembly has a hole formed therein. Aligning the holes permits insertion of an attachment pin therethrough, thereby attaching the trailer rack assembly to the bottom portion of the movable front assembly.

In a preferred trailer rack assembly, the top rearward attachment projection has a downwardly oriented notch formed therein and the top portion of the rear tandem assembly has a transverse attachment bar extending therefrom. The notch is capable of capturing and engaging the attachment bar upon seating the notched top rearward attachment projection on the attachment bar. In this preferred embodiment, the top forward attachment projection preferably has a downwardly oriented notch formed therein and the top portion of the movable front assembly preferably has a transverse attachment bar extending therefrom. The notch is capable of capturing and engaging the attachment bar upon seating the notched top forward attachment projection on the attachment bar. In this preferred embodiment, the movable front assembly is mountable on a tractor. The movable front assembly preferably includes a gooseneck subassembly having a pneumatic spring mechanism for orienting the movable front assembly during mounting to the tractor.

A preferred trailer rack assembly further includes a pair of railroad wheel assemblies. Each of the pair of railroad wheel assemblies has a transversely extending portion capable of supporting the trailer rack assembly above the ground surface. Each of the pair of railroad wheel assemblies also has a transverse axle extending therefrom and a pair of metallic wheels rotatably mounted thereon. Each of the metallic wheels is capable of frictionally engaging a rail disposed on the ground surface.

In a preferred trailer rack assembly, each of the pair of wheels is rotatably mounted on the at least one transverse axle of the rear tandem assembly has a vehicular tire mounted thereon. In this preferred embodiment. The at least one transverse axle of the rear tandem assembly includes a pair of transverse axles. Each of the transverse axles has a pair of wheels rotatably mounted thereon. Each of the wheels has a vehicular tire mounted thereon.

BRIEF DESCRIPTION OF THE DRAWINGS

FIG. 2a is a side elevation view of the railroad wheel subassembly illustrated in FIG. 2.

FIG. 3 is a side elevation view of one embodiment of the rear tandem assembly, as attached to the rearward portion of an embodiment of the present trailer rack assembly.

FIG. 4 is a side elevation view of one embodiment of the movable front assembly (commonly referred to as the "gooseneck assembly"), as attached to a forward portion of an embodiment of the present trailer rack assembly, and also illustrating the attachment of the movable front assembly to a tractor.

FIG. 5a is a front elevation view of an embodiment of the present trailer rack assembly in which a plurality of vertically-oriented panel is mounted.

FIG. 5b is a side elevation view of the embodiment of the present trailer rack assembly illustrated in FIG. 5a.

FIG. 7 is an exploded side elevation view of an embodiment of the present trailer rack assembly showing the relative positions of the trailer rack assembly, the movable front assembly and the rear tandem assembly.

FIG. 7a is a top view of the embodiment of the trailer rack assembly illustrated in FIG. 7.

FIG. 8a is a side elevation view of an embodiment of the present trailer rack assembly showing its assembly to the movable front assembly and the rear tandem assembly, in the transport position.

FIG. 8b is a side elevation view of an embodiment of the present trailer rack assembly showing its assembly to the movable front assembly and the rear tandem assembly, in the unloading position.

FIG. 8c is a top view of the embodiment of the trailer rack assembly of FIGS. 8a and 8b, as attached to the movable front assembly and the rear tandem assembly, and also illustrating the attachment of the movable front assembly to a tractor.

FIGS. 8d and 8e are front elevation views of the embodiment of the trailer rack assembly of FIGS. 8a, 8b and/or 8c, illustrating alternative placements of vertically-oriented panels in the trailer rack assembly.

FIG. 8f is a side elevation view of showing the attachment of a movable front assembly to a rear tandem assembly, for transporting those assemblies after removal of the trailer rack assembly (not shown in FIG. 8f) that had been attached between the movable front assembly and the rear tandem assembly.

DETAILED DESCRIPTION OF PREFERRED EMBODIMENT(S)

Figure 1:
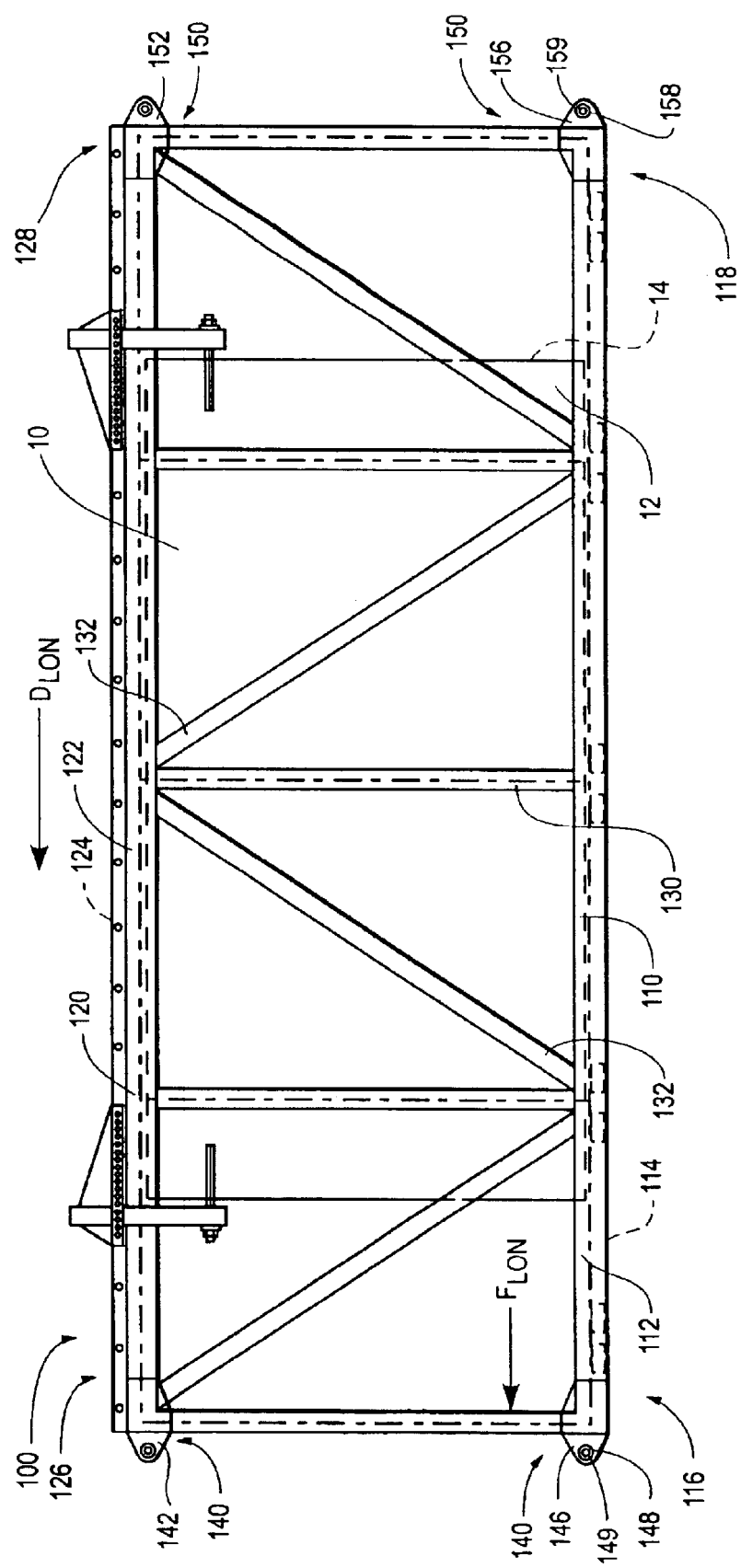
FIG. 1 is a side elevation view of an embodiment of the present combination trailer and storage rack assembly for storing and transporting one or more vertically-oriented panels.

Turning first to FIG. 1, an embodiment of the present combination trailer and storage rack assembly 100 stores and transports one or more vertically-oriented panels, one of which is shown in FIG. 1 as panel 10. Each panel 10 has two oppositely facing outwardly projecting major planar surfaces, one of which is depicted in FIG. 1 as surface 14 and another which is depicted as surface 12.

In one embodiment, panel 10 is a precast concrete building panel. Such precast concrete building panels exhibit fragility to impacts directed upon one or more of its major planar surfaces. A lateral force capable of directing such an impact is depicted by vector $F_{lat}$ in FIG. 2.

Returning to FIG. 1, a bottom frame 110 supports panel 10 in a vertical position. Bottom frame 110 has a pair of longitudinally extending side portions, one of which is depicted in FIG. 1 as side portion 114 and another which depicted as side portion 112. FIG. 2 shows the other longitudinally extending side portion 112 of bottom frame 110. Bottom frame 110 has a forward portion 116 and a rearward portion 118.

As further shown in FIG. 1, a top frame 120 contains panel 10 while being supported on bottom frame 110. Top frame 120 has a pair of longitudinally extending side portions, one of which is depicted in FIG. 1 as side portion 124 and another which is depicted as side portion 122. FIG. 2 shows the other longitudinally extending side portion 122 of top frame 120. Top frame 110 has a forward portion 126 and a rearward portion 128.

A plurality of struts, one of which is depicted in FIG. 1 as strut 130, interconnect the bottom frame 110 and top frame 120. Two other struts are depicted in FIG. 1 as diagonally-oriented struts 132. As shown in FIG. 1, struts 130, 132 are preferably arranged in the form of a load-distributing truss, and are designed to be capable of absorbing and distributing lateral forces (that is, forces with a vector component that is perpendicular to the plane of the page containing; see also arrow $F_{lat}$ in FIG. 2) imposed upon bottom frame 110, top frame 120, the supported panel 10.

FIG. 1 shows rearwardly disposed attachment projections 150, a top one of which is shown as top rearwardly disposed attachment projection 152 and a bottom one of which is shown as bottom rearwardly disposed attachment projection 156. Each of the rearward projections 150 extends from a rearward portion 128 of top frame 120 and a rearward portion 118 of bottom frame 110, respectively. Such rearward attachment projections could also extend from any or all of bottom frame 110, top frame 120, and/or struts 130, 132. Bottom rearward attachment projection 156 has a hole 158 formed therein through which an attachment pin 159 can be inserted, as described in more detail below with respect to rear tandem assembly 170 in FIG. 3.

As further shown in FIG. 1, rearward attachment projection 152 is attachable to a rear tandem assembly. FIG. 3 shows such a rear tandem assembly 170 having a transverse axle 172 extending therefrom and a pair of wheels 174 rotatably mounted on axle 172. Each wheel 174 includes a tire 175 Rear tandem assembly 170 supports the attached trailer rack assembly 100 above a ground surface 20.

Returning again to FIG. 1, forwardly disposed attachment projections 140 are shown, a top one of which is shown as a top forwardly disposed attachment projection 142 and a bottom one of which is shown as bottom forwardly disposed attachment projection 146. Each of the forward projections 140 extends from a forward portion 126 of top frame 120 and a forward portion 116 of bottom frame 110, respectively. Such forward attachment projections could also extend from any or all of bottom frame 110, top frame 120, and/or strut 130, 132. Bottom forward attachment projection 146 has a hole 148 formed therein, through which an attachment pin 149 can be inserted, as described in more detail below with respect to movable front assembly 160 of FIG. 4.

In operation, a longitudinal force, depicted by arrow $F_{lon}$ in FIG. 1 (see also FIG. 3), imposed upon one or both of the front assembly and rear assembly correspondingly urges the trailer rack assembly in the longitudinal direction, which is depicted by arrow $D_{lon}$ in FIG. 1 (see also FIG. 3).

FIG. 2 shows trailer rack assembly 100 of FIG. 1, as mounted on an embodiment of a railroad wheel subassembly 210. FIG. 2a is a side view of the railroad wheel subassembly 210 illustrated in FIG. 2. As shown in FIGS. 2 and 2a, railroad wheel subassembly 210 preferably includes a transverse portion 212, which is capable of supporting trailer rack assembly 100 above ground surface 20. Persons skilled in the technology involved here will recognize that two or more railroad wheel assemblies will generally be required to supporting trailer rack assembly 100 above ground surface 20. Railroad wheel subassembly 210 of FIGS. 2 and 2a also preferably has a transverse axle 214 extending therefrom and a pair of wheels 216 rotatably mounted on axle 214. Each of the wheels, which are preferably metallic and/or formed from a durable weight-bearing material, is capable of frictionally engaging a rail 218 disposed on ground surface 20.

FIG. 3 shows an embodiment of a rear tandem assembly 170, as attached to the rearward portion of an embodiment of trailer rack assembly 100. Bottom rearward attachment projection 156 has a hole 158 formed therein. Similarly, the bottom portion of rear tandem assembly 170 has a hole 176 formed therein. Aligning the holes 158, 176 permits insertion of an attachment pin 159 therethrough, thereby attaching the trailer rack assembly 110 to the bottom portion of the rear tandem assembly 170.

In a preferred embodiment, trailer rack assembly 100 also has a top rearward attachment projection 152, which has a downwardly oriented notch 154 formed therein. Top portion of rear tandem assembly 170 preferably has a transverse attachment bar 178 extending therefrom. In operation, notch 154 is capable of capturing and engaging attachment bar 178 upon seating the notched top rearward attachment projection 152 on attachment bar 178.

FIG. 4 shows an embodiment of a movable front assembly 160, which is commonly referred to as a "gooseneck assembly". As shown in FIG. 4, movable front assembly 160 is attached to a forward portion of an embodiment of trailer rack assembly 100. Movable front assembly 160 includes a gooseneck 167, which in the illustrated embodiment is pivotally attached at its rearward end to another portion of movable front assembly 160 by an attachment pin mechanism 169.

Bottom forward attachment projection 146 has a hole 148 formed therein. Similarly, the bottom portion of movable front assembly 160 has a hole 166 formed therein. Aligning the holes 148, 166 permits insertion of an attachment pin 149 therethrough, thereby attaching the trailer rack assembly 110 to the bottom portion of the movable front assembly 160.

As with its rearward portion, in a preferred embodiment trailer rack assembly 100 also has a top forward attachment projection 142, which has a downwardly oriented notch 144 formed therein. Top portion of movable front assembly 160 preferably has a transverse attachment bar 168 extending therefrom. In operation, notch 144 is capable of capturing and engaging attachment bar 168 upon seating the notched top forward attachment projection 142 on attachment bar 168.

FIG. 4 also illustrates the attachment of movable front assembly 160 to pivotable fifth wheel 182 of an engine-powered tractor 180.

As further shown in FIG. 4, movable front assembly 160 includes a gooseneck subassembly 190 having a pneumatic (preferably air) spring mechanism 192 for orienting movable front assembly 160 during mounting to the fifth wheel 182 of tractor 180.

FIG. 5a illustrates the mounting of a plurality of vertically-oriented panels 10 in an embodiment of trailer rack assembly 100, including the panel spacers and restraining mechanisms employed in that embodiment. Similarly, FIG. 5b illustrates the mounting of a plurality of vertically-oriented panels in another embodiment of trailer rack assembly 100, including the panel spacers and restraining mechanisms employed in that alternative embodiment.

Figure 6:
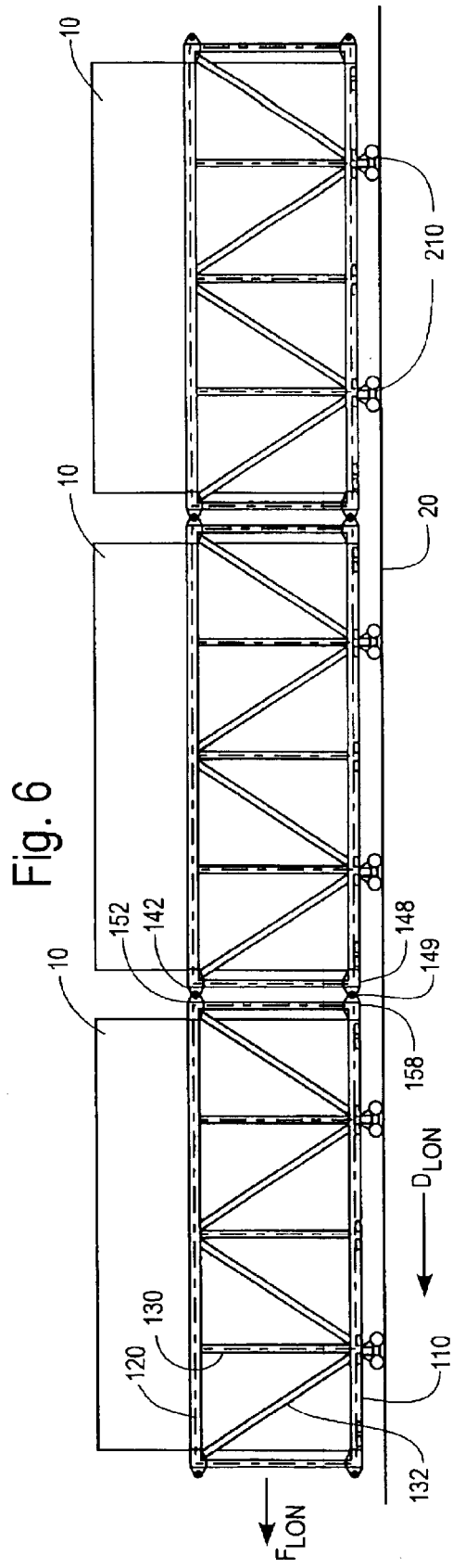
FIG. 6 is a side elevation view of a multi-rack embodiment of the present trailer rack assembly having three attached racks, each mounted on a railroad wheel subassembly.
Figure 6A:
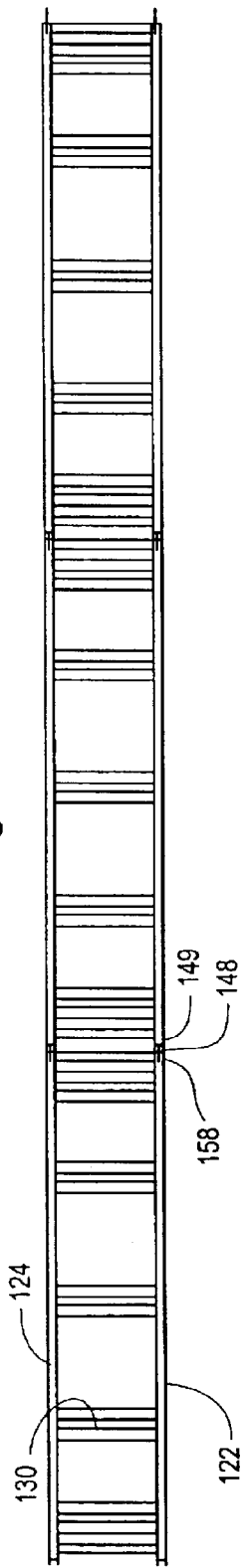
FIG. 6a is a top view of the multi-rack embodiment of the present trailer rack assembly illustrated in FIG. 6.

FIGS. 6 and 6a show a multi-rack embodiment of trailer rack assembly 100 in which three racks are connected in tandem using the pinned hole attachment technique described above with respect to the attachment of the bottom forward and rearward portions of trailer rack assembly, to the bottom portion of movable front assembly and the bottom portion of rear tandem assembly, illustrated in FIGS. 3 and 4. It will be appreciated, of course, that a greater number of racks than the three shown in FIGS. 6 and 6a could be pinned together to form a multi-rack assembly, the limit being the number of racks that can securely and safely be transported in tandem and as a trailer assembly being pulled behind a tractor on the common roadways. As shown in FIG. 6, each of the racks in the multi-rack embodiment is mounted on a railroad wheel subassembly 210, of the type described above with respect to the railroad wheel subassembly illustrated in FIGS. 2 and 2a.

FIGS. 7 and 7a illustrate the relative positions, when assembled, of trailer rack assembly 100, movable front assembly 160 and rear tandem assembly 170. As shown particularly in FIG. 7, movable front assembly 160 includes a gooseneck subassembly 190 having a pneumatic spring mechanism (shown and described in more detail in connection with FIG. 4) for orienting movable front assembly 160 during mounting to fifth wheel 182 of tractor 180.

FIG. 8a illustrates trailer rack assembly 100, and attached movable front assembly 160 and rear tandem assembly 170, in the assembled transport position. FIG. 8b is a related illustration of trailer rack assembly 100, and attached movable front assembly 160 and rear tandem assembly 170, in the unloading position. It will be appreciated that the unloading position depicted in FIG. 8c is readily achieved by actuation of one or more pneumatic directional control valves associated with pneumatic spring assembly 192 (see FIG. 4 and accompanying text), which orients movable front assembly 160 to a position for dismounting the gooseneck portion of movable front assembly 160 from the fifth wheel of tractor 180. In this regard, the mechanism(s) by which the movements of pneumatic springs are effected are the conventional air valves and controls that are typically associated with commercial trucks.

FIG. 8c illustrates trailer rack assembly 100 of FIGS. 8a and 8b, as attached to movable front assembly 160 and rear tandem assembly 170, and also illustrating the attachment of movable front assembly 160 to tractor 180.

FIGS. 8d and 8e illustrate trailer rack assembly 100 of FIGS. 8a, 8b and/or 8c, showing alternative placements of vertically-oriented panels 10 in trailer rack assembly 100.

FIG. 8f shows the attachment of movable front assembly 160 to a rear tandem assembly 170, for transporting those assemblies after removal of the trailer rack assembly (not shown in FIG. 8f) that had been attached between movable front assembly 160 and rear tandem assembly 170.

Figure 9A:
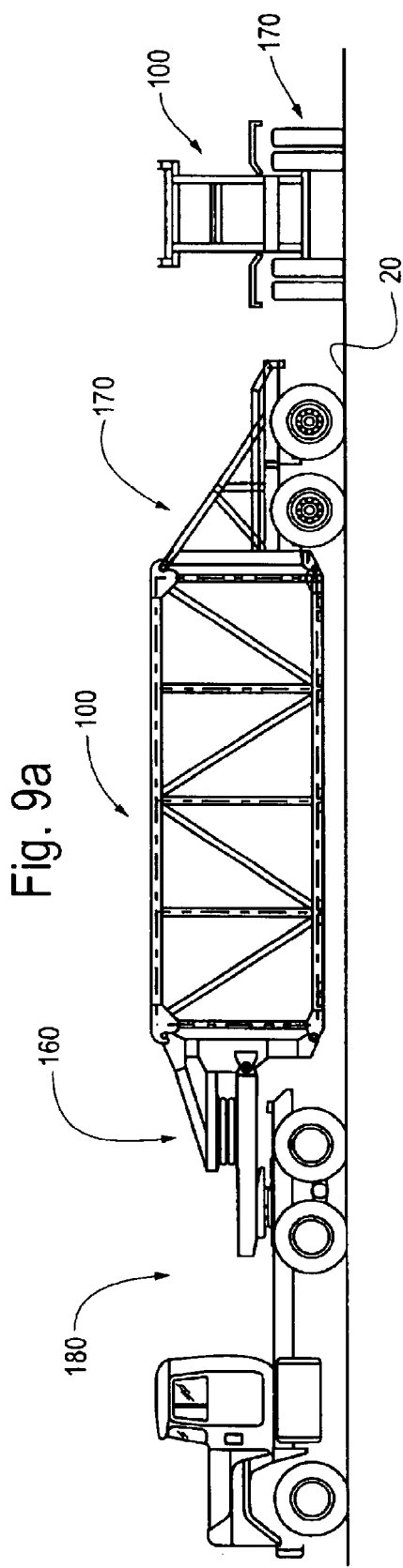
FIGS. 9a, 9b and 9c are side elevation views showing the relative positions of an embodiment of the present trailer rack assembly being sequentially detached from the movable front assembly and the rear tandem assembly.
Figure 9B:
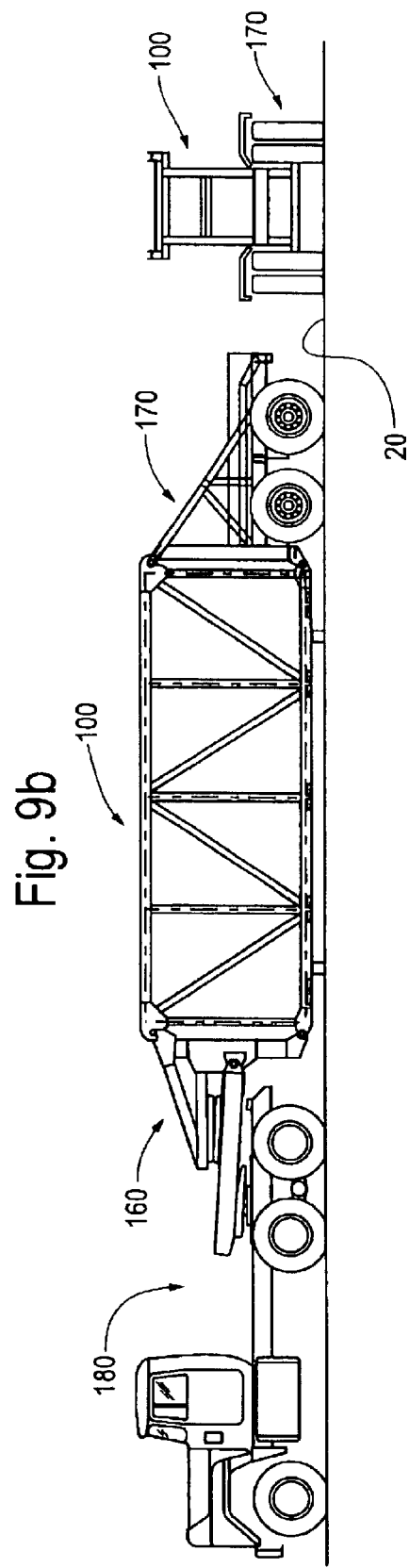
Figure 9C:
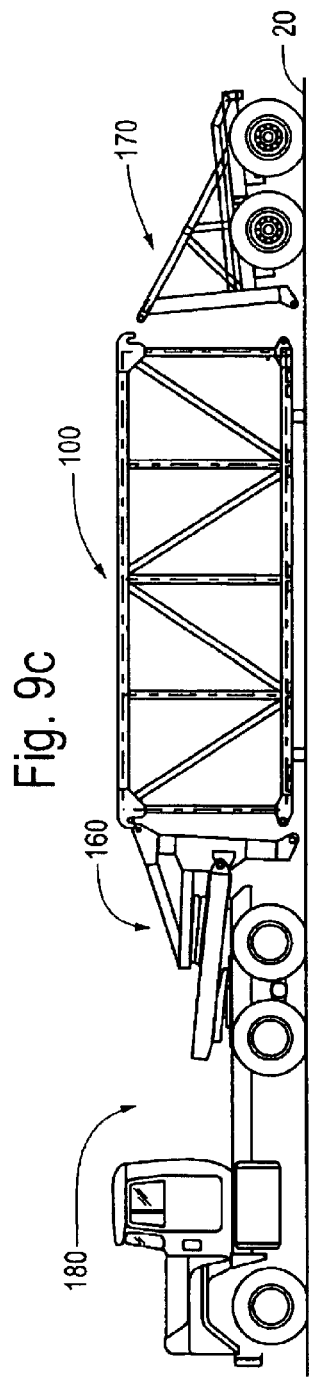

FIGS. 9a, 9b and 9c show the relative positions of trailer rack assembly 100 being sequentially detached from movable front assembly 160 and rear tandem assembly 170.

Figure 10A:
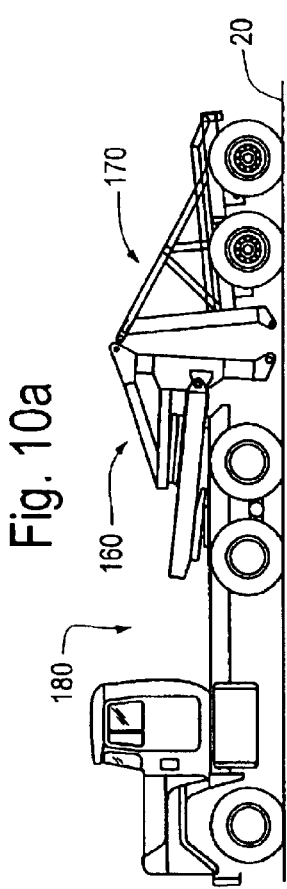
FIGS. 10a and 10b are side elevation views showing the relative positions of the movable front assembly and rear tandem assembly of FIGS. 9a, 9b and 9c being sequentially attached together for transporting those assemblies after removal of the trailer rack assembly (not shown in FIGS. 10a and 10b) that had been attached between the movable front assembly and the rear tandem assembly.
Figure 10B:
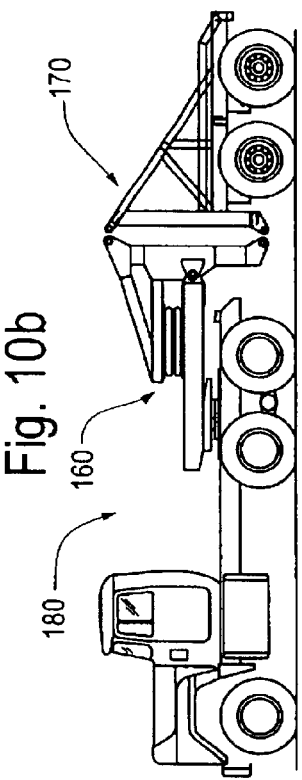

FIGS. 10a and 10b show the relative positions of movable front assembly 160 and rear tandem assembly 170 of FIGS. 9a, 9b and 9c being sequentially attached together for transporting those assemblies after removal of the trailer rack assembly (not shown in FIGS. 10a and 10b) that had been attached between movable front assembly 160 and rear tandem assembly 170.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A combination trailer and storage rack assembly for storing and transporting an object having two oppositely facing outwardly projecting major planar surfaces, the trailer rack assembly comprising:

(a) a bottom frame for supporting the panel in a vertical position, the bottom frame having a pair of longitudinally extending side portions;

(b) a top frame for containing the panel while being supported on the bottom frame, the top frame having a pair of longitudinally extending side portions;

(c) a plurality of struts interconnecting the bottom and top frames, the struts capable of absorbing and distributing lateral forces imposed upon at least one of the top frame, the bottom frame, and the supported panel;

(d) at least one rearwardly disposed attachment projection extending from a rearward portion of at least one of the top frame, the bottom frame and an interconnecting strut, the at least one rearward attachment projection attachable to a rear tandem assembly having at least one transverse axle extending therefrom and a pair of wheels rotatably mounted on the at least one axle, the rear tandem assembly supporting the attached trailer rack assembly above a ground surface wherein the top rearward attachment projection has a downwardly oriented notch formed therein and the top portion of the rear tandem assembly has a transverse attachment bar extending therefrom, the notch capable of capturing and engaging the attachment bar upon seating the notched top rearward attachment projection on the attachment bar; and (e) at least one forwardly disposed attachment projection extending from a forward portion of at least one of the top frame, the bottom frame and an interconnecting strut, the forward attachment projection attachable to a movable front assembly, the movable front assembly supporting the attached trailer rack assembly above the ground surface;

whereby imparting a longitudinal force to at least one of the front and rear assemblies correspondingly urges the trailer rack assembly in the longitudinal direction.

2. The trailer rack assembly of claim 1, wherein the top forward attachment projection has a downwardly oriented notch formed therein and the top portion of the movable front assembly has a transverse attachment bar extending therefrom, the notch capable of capturing and engaging the attachment bar upon seating the notched top forward attachment projection on the attachment bar.

3. The trailer rack assembly of claim 1, wherein at least some of the interconnecting struts are arranged to form a load-distributing truss.

4. The trailer rack assembly of claim 1, wherein the at least one rearwardly disposed attachment projection comprises a top rearward attachment projection that extends from a rearward portion of the top frame and a bottom rearward attachment projection that extends from a rearward portion of the bottom frame, the top rearward attachment projection being attachable to a top portion of the rear tandem assembly, and the bottom rearward attachment projection being attachable to a bottom portion of the rear tandem assembly.

5. The trailer rack assembly of claim 1, wherein the bottom rearward attachment projection has a hole formed therein and the bottom portion of the rear tandem assembly has a hole formed therein, whereby aligning the holes permits insertion of an attachment pin therethrough, thereby attaching the trailer rack assembly to the bottom portion of the rear tandem assembly.

6. The trailer rack assembly of claim 5, wherein the bottom forward attachment projection has a hole formed therein and the bottom portion of the movable front assembly has a hole formed therein, whereby aligning the holes permits insertion of an attachment pin therethrough, thereby attaching the trailer rack assembly to the bottom portion of the movable front assembly.

7. The trailer rack assembly of claim 1, wherein the movable front assembly is mountable on a tractor.

8. The trailer rack assembly of claim 1 further comprising a pair of railroad wheel assemblies, each of the pair of railroad wheel assemblies having a transversely extending portion capable of supporting the trailer rack assembly above the ground surface, and having a transverse axle extending therefrom and a pair of metallic wheels rotatably mounted thereon, each of the metallic wheels capable of frictionally engaging a rail disposed on the ground surface.

9. The trailer rack assembly of claim 1, wherein each of the pair of wheels rotatably mounted on the at least one transverse axle of the rear tandem assembly has a vehicular tire mounted thereon.

10. The trailer rack assembly of claim 9, wherein the at least one transverse axle of the rear tandem assembly comprises a pair of transverse axles, each of the transverse axles having a pair of wheels rotatably mounted thereon, each of the wheels having a vehicular tire mounted thereon.

11. A combination trailer and storage rack assembly for storing and transporting an object having two oppositely facing outwardly projecting major planar surfaces, the trailer rack assembly comprising:

(a) a bottom frame for supporting the panel in a vertical position, the bottom frame having a pair of longitudinally extending side portions;

(b) a top frame for containing the panel while being supported on the bottom frame, the top frame having a pair of longitudinally extending side portions;

(c) a plurality of struts interconnecting the bottom and top frames, the struts capable of absorbing and distributing lateral forces imposed upon at least one of the top frame, the bottom frame, and the supported panel;

(d) at least one rearwardly disposed attachment projection extending from a rearward portion of at least one of the top frame, the bottom frame and an interconnecting strut, the at least one rearward attachment projection attachable to a rear tandem assembly having at least one transverse axle extending therefrom and a pair of wheels rotatably mounted on the at least one axle, the rear tandem assembly supporting the attached trailer rack assembly above a ground surface;

(e) at least one forwardly disposed attachment projection extending from a forward portion of at least one of the top frame, the bottom frame and an interconnecting strut, the forward attachment projection attachable to a movable front assembly, the movable front assembly supporting the attached trailer rack assembly above the ground surface; and (f) a pair of railroad wheel assemblies, each of the pair of railroad wheel assemblies having a transversely extending portion capable of supporting the trailer rack assembly above the ground surface, and having a transverse axle extending therefrom and a pair of metallic wheels rotatable mounted thereon, one of railroad wheel assemblies moveable independently from the other railroad wheel assembly, each of the metallic wheels capable of frictionally engaging a rail disposed on the ground surface; whereby imparting a longitudinal force to at least one of the front and rear assemblies correspondingly urges the trailer rack assembly in the longitudinal direction.

\* \* \* \* \*